United States Patent [19]

Dembski

[11] 4,056,890
[45] Nov. 8, 1977

[54] TETHERED DECOY

[76] Inventor: Gary R. Dembski, 305 Grand Blvd., Wauconda, Ill. 60084

[21] Appl. No.: 665,685

[22] Filed: Mar. 10, 1976

[51] Int. Cl.² ............................................. A01M 31/06
[52] U.S. Cl. ......................................................... 43/3
[58] Field of Search ............................................ 43/3, 2

[56] References Cited

U.S. PATENT DOCUMENTS

| 1,185,559 | 5/1916 | Vaughan | 43/3 |
| 1,789,649 | 1/1931 | Gazecki et al. | 43/3 |
| 1,967,902 | 7/1934 | Reichel | 43/3 |
| 2,539,727 | 1/1951 | Clark | 43/3 |
| 2,813,363 | 11/1957 | Leckner | 43/3 |

Primary Examiner—Warner H. Camp
Attorney, Agent, or Firm—Allen D. Brufsky

[57] ABSTRACT

A decoy includes a shell wherein a coil spring which is operable to provide power for playing a phonograph recording of a duck call. Additionally the shell includes a pawl and ratchet arrangement operable to wind and unwind a tether line connected to an anchor.

1 Claim, 2 Drawing Figures

TETHERED DECOY

BACKGROUND OF THE INVENTION

1. Field of the Invention

This invention relates to decoys and more particularly to a tethered decoy used for hunting ducks.

2. Description of the Prior Art

Typically, a decoy is placed in water near a duck blind where a hunter, armed with a shotgun, is concealed. The hunter, while awaiting an arrival of ducks near the decoy, may make sounds known as duck calls. The decoy and the duck calls attract ducks into range of the shotgun.

The decoy is usually comprised of a buoyant material which floats on the water. Aspects of a simulation of a duck, such as the duck calls and a bobbing up and down of the duck in the water, are not provided by the decoy. Because the aspects of the simulation are not provided, the simulation is usually crude whereby the decoy fails to attract ducks.

SUMMARY OF THE INVENTION

An object of the present invention is to provide a decoy which realistically simulates a duck.

According to the present invention, a decoy comprises a shell tethered to an anchor by a line connected to a first spring; within said shell is a second spring which provides power for playing a recording of a duck call.

The invention provides an improved decoy which provides duck calls. Additionally, the improved decoy is tethered to an anchor by a line and a spring. The duck calls and the tethering provide a realistic simulation of a duck.

Other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
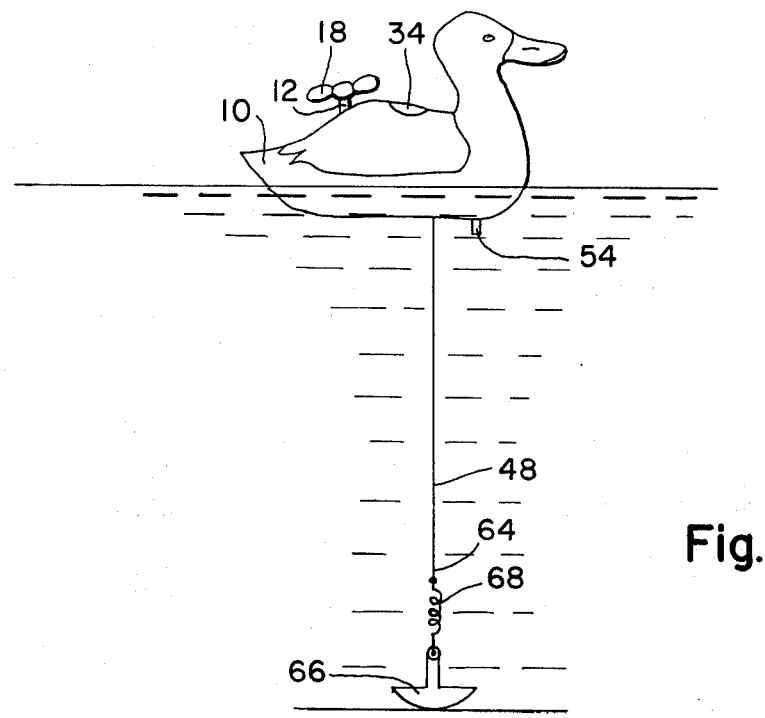
FIG. 1 is a side elevation of a preferred embodiment of the present invention.
Figure 2:
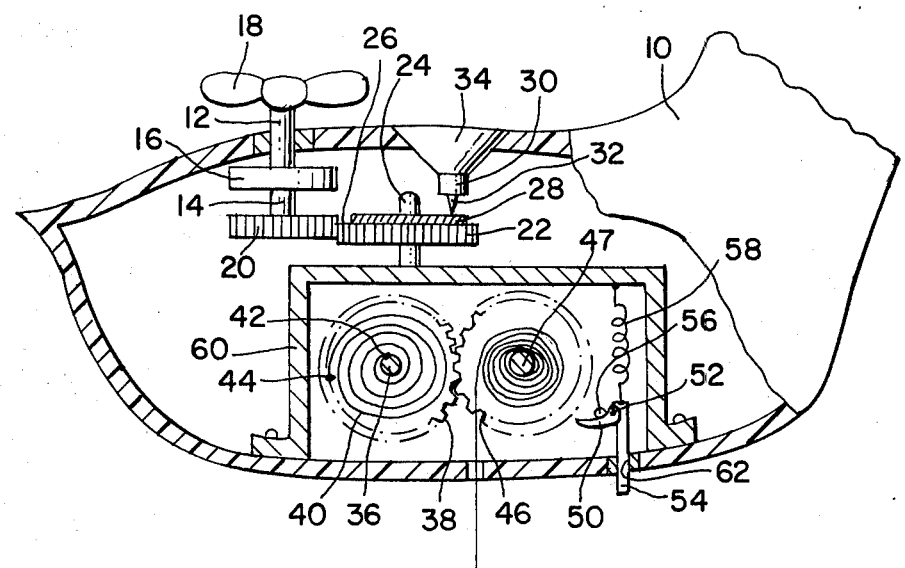
FIG. 2 is a side elevation of a decoy of FIG. 1 with a portion broken away.

Referring to FIGS. 1 and 2, a decoy is comprised of an outer shell 10 made from a plastic painted to resemble a duck.

Within the shell 10, shafts 12, 14 have proximal ends coaxially connected together through a coil spring 16. The shaft 12 extends to the outside of the shell 10 where the distal end of the shaft 12 is fixedly connected to a wind-up key 18. A hunter uses the wind-up key 18 to wind the coil spring 16. As explained hereinafter, the coil spring 16 provides power for playing a phonograph recording of a duck call.

The distal end of the shaft 14 has mounted thereon a gear 20 which engages a gear 22 rotatably mounted on a spindle 24. A face 26 of the gear 22 supports a phonograph record 28 with a central hole therein which receives the spindle 24. Accordingly, the face 26 is a surface of a turntable for the record 28.

It should be understood that duck calls are substantially invarient. Because the duck calls are invarient, a duck call is recorded along a selected radius of the record 28.

At the selected radius, a magnetic pick-up 30 includes a phonograph needle 32 which receives vibrations from the record 28. The pick-up 30 is connected to a loudspeaker 34 whereby an unwinding of the coil spring 16 rotates the gear 20 thereby causing a rotation of the gear 22. Because the gear 22 rotates, the recorded duck call is iteratively played through the speaker 34.

Additionally within the shell 10 is a fixedly mounted shaft 36 upon which a gear 38 is rotatably mounted. The shaft 36 and the gear 38 are respectively connected to a coil spring 40 at ends 42, 44 thereof. As explained hereinafter, the coil spring 40 provides power for reeling in a tether line which is used to anchor the decoy.

The gear 38 meshes with a ratchet 46 having a face upon which a tether line 48 is wound. The ratchet 46 is fixedly mounted on a rotatable shaft 47. Additionally, the ratchet 46 is normally engaged by a pawl 50 pivotally connected by a pivot pin 52 to a release button 54. The pawl 50 is in slidable contact with a fixedly mounted dowl 56 which is explained hereinafter It should be understood that when the ratchet 46 is engaged, the ratchet 46 cannot be rotated whereby the tether line 48 can neither wind nor unwind.

One end of the button 54 is connected through an expansion spring 58 to a fixedly mounted gear case 60, the other end extending through a hole 62 in the shell 10. The spring 58 restrains the button 54 in a lock position whereby the ratchet 46 is maintained in engagement with the pawl 50.

In response to the hunter depressing the button 54 to a release position, the pawl 50 is forced to slide against the dowl 56, causing the pawl 50 to pivot on the pin 52 whereby the ratchet 46 is disengaged from the pawl 50. Because the ratchet 46 is disengaged, the hunter may pull the tether line 48, causing the unwinding thereof from the ratchet 46 and a winding of the coil spring 40. It should be understood that because the unwinding of the tether line 48 causes a winding of the spring 40, when the hunter holds the button 54 in the release position and the tether line 48 is not held by the hunter, the spring 40 causes a winding of the tether line 48.

When the hunter releases the button 54, the spring 58 causes the button 54 to return to the lock position whereby the ratchet 46 is engaged.

A free end 64 of the tether line 48 is connected to an anchor 66 through an expansion spring 68. Accordingly, when the hunter unwinds the tether line 48, and places the decoy in water, the spring 68 causes the decoy to realistically bob up and down in a manner simulating a duck.

Thus, there is described hereinbefore a decoy which realistically simulates a duck.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the U.S. is:

1. In a decoy with an outer shell having the general appearance of a duck, the improvement comprising:

means disposed within said shell for playing a phonograph record; and a tether line connected to said decoy;

an anchor; and an expandible and contractible coil spring connected between said anchor and a free end of said tether line, said playing means comprising:

a rotatably mounted first gear having a face adapted to receive said phonograph record; and a second gear mounted for engagement with said first gear;

a spring motor operable to cause rotation of said second gear; and means accessible from the exterior of said shell for winding said spring motor;

a ratchet adapted to have said tether line wound thereon;

a coil spring connected to said ratchet to cause rotation thereof;

a pivotally mounted pawl;

a spring-mounted release button connected to said pawl accessible from the exterior of said shell, said button having lock and release positions which causes said pawl to pivot to respectively engage and disengage said ratchet and upon disengagement to enable said ratchet to be manually rotated to unwind said tether line or for said coil spring to rotate said ratchet to wind said tether line thereabout and a fixedly mounted dowel in slidable engagement with said pawl for pivoting said pawl to disengage said ratchet when said release button is pushed against the bias of its spring-mounting.

* * * * *